United States Patent [19]

Epp et al.

[11] Patent Number: 5,735,386
[45] Date of Patent: Apr. 7, 1998

[54] TUBE AND BELT CONVEYOR

[76] Inventors: Richard J. Epp; Dwayne S. Epp, both of Box 64, Fiske, Saskatchewan, Canada, S0l 1C0

[21] Appl. No.: 649,756

[22] Filed: May 15, 1996

[51] Int. Cl.⁶ .................................................. B65G 47/56
[52] U.S. Cl. ........................ 198/550.01; 198/550.1; 198/533; 222/271
[58] Field of Search ................. 198/550.01, 550.1, 198/550.5, 550.6, 658, 670, 671, 533, 818, 819, 820; 222/271, 412, 413

[56] References Cited

U.S. PATENT DOCUMENTS

| | | | |
|---|---|---|---|
| 1,880,840 | 10/1932 | Cussier | 198/550.1 X |
| 5,052,545 | 10/1991 | Gongen | 198/818 X |
| 5,101,961 | 4/1992 | Bengtson et al. | 198/550.1 |
| 5,176,295 | 1/1993 | Stefanik | 222/271 |

FOREIGN PATENT DOCUMENTS 4132237  2/1992  Germany ........................ 198/670

*Primary Examiner*—James R. Bidwell
*Attorney, Agent, or Firm*—Adrian D. Battison; Murray E. Thrift

[57] ABSTRACT

A belt conveyor comprises an elongate tube with an upper run of the belt passing through the tube from a hopper at a lower exposed feed portion of the belt. The feeding of the material from the hopper onto the belt and into the tube is enhanced by the addition of a tapered auger flight on a shaft extending longitudinally of the belt from the bearing at the rear wall of the hopper to a hanger bearing within the tube. The auger flight assists in transporting the material through the open mouth of the tube and spreading the material over the surface of the belt.

8 Claims, 2 Drawing Sheets

TUBE AND BELT CONVEYOR

BACKGROUND OF THE INVENTION

This invention relates to a tube and belt conveyor of the type which comprises a tube through which a particulate material is to be transported and a belt having a feed run passing through the tube and a return run passing outside the tube with a feed portion of the belt exposed beyond a feed end of the tube. The particulate material to be transported can be deposited onto the feed portion of the belt for entry into the tube with the belt.

Such belt conveyors have been widely used for many years but are somewhat disadvantageous relative to the alternative construction of an auger in that the feed rate is relatively slow so the amount of time necessary for transportation of a predetermined amount of material is significantly increased or the size of the equipment must be increased.

The more efficient auger is however disadvantageous in regard to pulse crops and the like such as peas since the auger flighting tends to damage the seeds generally by pinching the seeds between the edge of the auger flight and the wall of the auger tube.

SUMMARY OF THE INVENTION

It is one object of the present invention, therefore, to provide an improved belt-type conveyor in which the rate of transportation is significantly increased.

According to one aspect of the invention there is provided a conveyor comprising: an elongate tube having a feed end; an endless belt; guide means mounting the belt such that a feed run of the belt passes through the tube for carrying particulate material therethrough and a return run passes outside the tube with a feed end portion of the belt exposed beyond the feed end of the tube; a hopper at the feed end of the tube for directing particulate material deposited into the hopper such that the particulate material is guided onto the feed end portion of the belt and is moved thereon longitudinally of the tube into the feed end of the tube; and an auger feed member mounted above the feed end of the belt and extending longitudinally therealong with a forward end of the auger feed member projecting into the feed end of the tube for assisting the feed of the particulate material into the feed end of the tube.

Preferably the auger feed member comprises an elongate shaft with a flight engaged around the shaft and the flight is along the full length of the shaft.

Preferably the flight is arranged such that its outside diameter decreases from an end remote from the feed end of the tube to the end inside the feed end of the tube and more preferably the flight gradually tapers from the remote end to the inside end.

Preferably the shaft is substantially parallel to the belt.

Preferably the shaft is arranged with height such that the larger end of the flight is spaced above the belt and the portion of the flight extending into the tube is spaced from the tube.

Preferably the shaft is mounted at a rear end on an end wall of the hopper and at a forward end on a hanger member located inside the tube.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
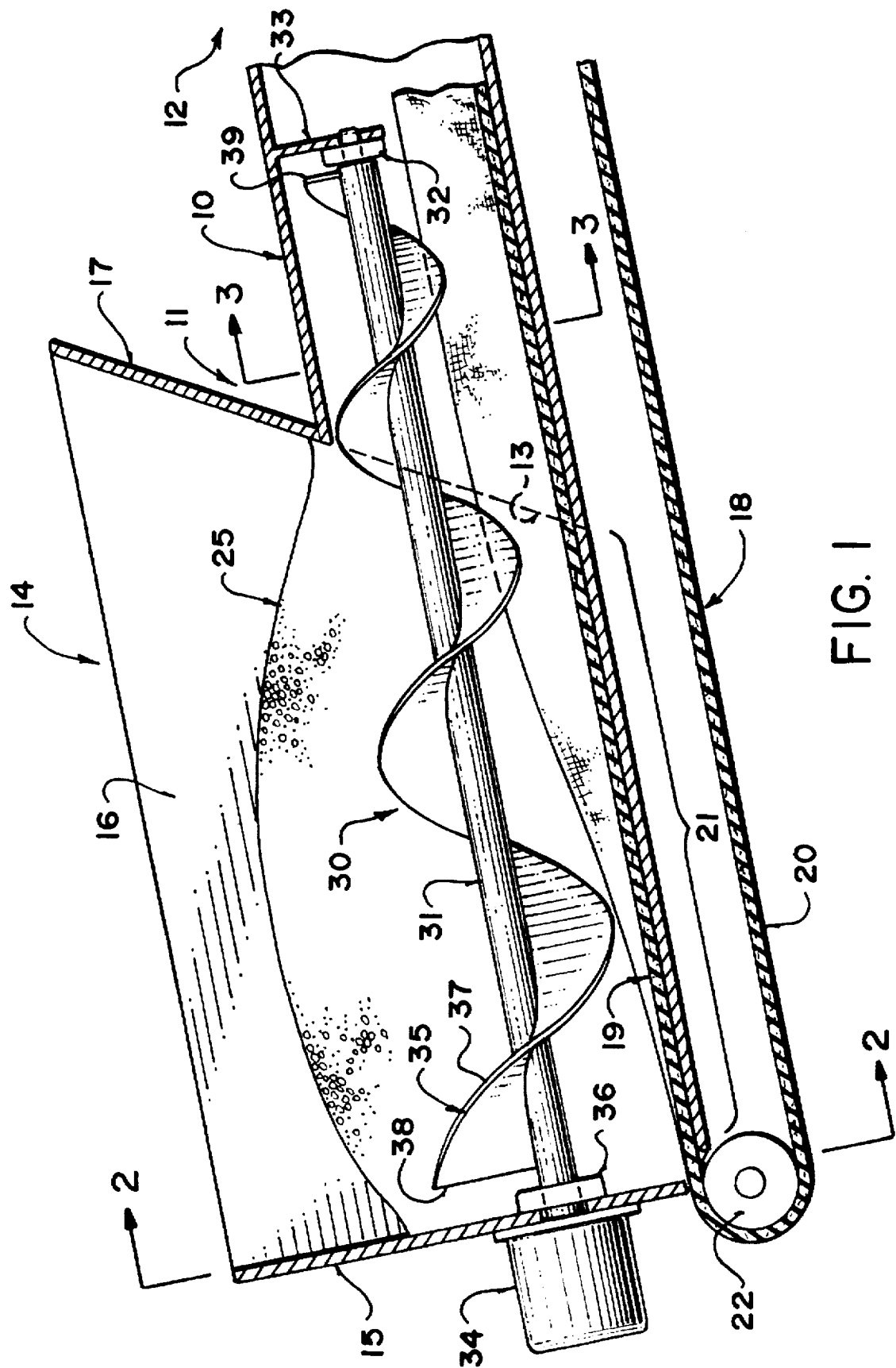
FIG. 1 is a vertical cross sectional view through the lower end of a bulk-conveyor according to the present invention.
Figure 2:
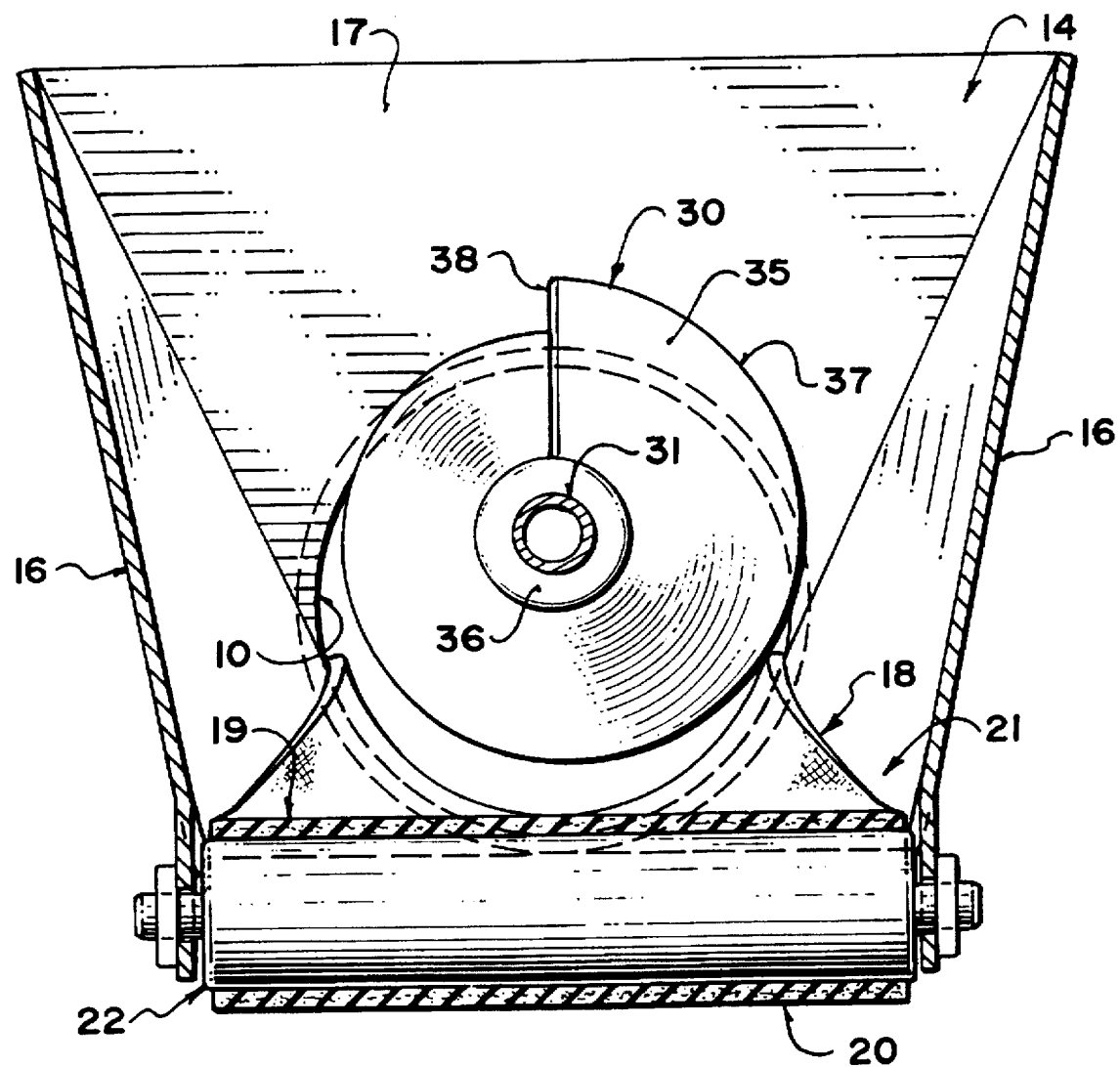
FIG. 2 is a cross sectional view along the lines 2—2 of FIG. 1.
Figure 3:
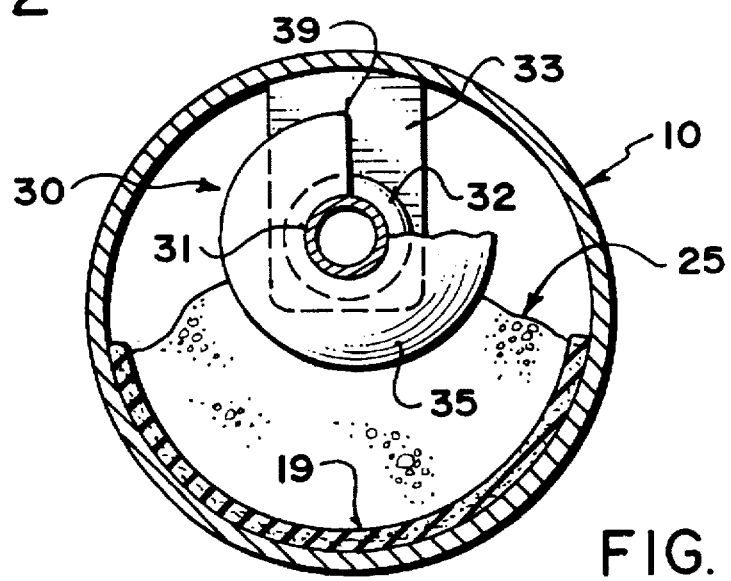
FIG. 3 is a cross sectional view along the lines 3—3 of FIG. 1.

The conveyor shown in FIGS. 1, 2 and 3 comprises a tube 10 of a cylindrical steel wall formed of a constant cross section which extends from a feed end 11 to a discharge end 12. Only the lower part of the tube is shown since the remainder of the tube, its discharge spout and the supporting structure for the tube are conventional and well known to one skilled in the art.

The tube includes a feed end 13 at which the cylindrical wall ends and this is connected to a hopper generally indicated at 14 having a rear wall 15, two side walls 16 and a front wall 17 for converging the material for transportation through the tube 10.

The conveyor further includes a belt 18 having an upper run 19 which goes through the tube and the return run 20 arranged on the outside of the tube. The belt includes a feed portion 21 exposed beyond the feed end 13 of the tube. The belt is endless and is wrapped around a pair of guide rollers, the lower one of which is indicated at 22.

At the roller 22, the belt is flat and has a width greater than the diameter of the tube. Within the tube the belt is curved or part cylindrical so as to lie against a bottom wall of the tube in a cupping action to receive the material 25 on the cupped belt for transportation along the tube.

The hopper bottom is shaped to guide the belt from the flat position at the roller to the curved position entering the tube. The walls 15, 16 and 17 of the hopper are shaped to converge downwardly and inwardly so that material deposited through an upper open mouth of the hopper falls downwardly onto the belt at the feed portion 21 for transportation longitudinally of the belt with the belt into the tube 10.

The feed of material from the hopper into the tube is significantly enhanced by the addition of an auger feed member generally indicated at 30. The auger feed member comprises a shaft 31 which lies longitudinally of the belt centrally of the belt and above the belt. The shaft is substantially parallel to the center line of the belt so that its spacing from the belt remains substantially constant. A rear end of the shaft is carried in bearings 31 in the rear wall 15. A forward end of the shaft extends into the tube 10 and is carried on bearings 32 supported on a flat hanger plate 33 welded to the top wall of the tube on the inside of the tube part way along the tube.

The shaft is driven in rotation by a hydraulic motor 34 mounted on the end wall 15 outside of the hopper. The shaft 31 carries an auger flight 35 which is arranged helically around the shaft generally of constant pitch. The flight is however arranged so that an outer edge 37 gradually tapers from a maximum diameter at a lower end 38 to a minimum diameter at a forward end 39.

The position of the shaft 31 is arranged so that it is spaced sufficiently from the belt portion 21 so that at the maximum end of flight, the flight is spaced away from the belt and is not in any way in contact with the belt.

The taper of the auger flight is sufficient such that, at the mouth 13 of the tube, the flight extends into the tube but the edge 37 is spaced from the wall of the tube so that there is no contact between the edge of the flight and the wall of the tube. The spacing of the flight edge from the belt and the wall of the tube is sufficient such that there is no possibility of pinching seeds such a peas between the edge and the adjacent wall or belt.

The shaft is also parallel to the wall of the tube 10 and the shaft is spaced above the center line of the tube 10 so the hanger plate 33 extends only part way down the tube generally to a position less than the center of the tube.

The auger flight is rotated by the motor 34 in a direction to tend to drive the particulate material 25 through the open mouth 13 into the tube. In addition the auger flight tends to spread the particulate material more effectively over the belt. The combination therefore of the auger flight drive member and the belt provides a particularly effective technique for feeding the particulate material 25 from the hopper into the tube and depositing the material on the belt so that it is readily transported through the tube to a discharge spout. The auger flight extends only into the tube sufficiently to assist in feeding material through the open mouth 13 and to effect the spreading of the material over the belt. Beyond the hanger plate 33 and the forward end 39 of the auger flight, the material is transported wholly by the belt which extends through the majority of the elongate tube.

In alternative arrangements (not shown) the auger can be of increased length so that it extends a significant distance along the tube. The flight can also be of constant diameter or even reverse taper.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A conveyor comprising:

an elongate tube having a feed end;

an endless belt;

guide means mounting the belt such that a feed run of the belt passes through the tube for carrying particulate material therethrough and a return run passes outside the tube with a feed end portion of the belt exposed beyond the feed end of the tube;

a hopper at the feed end of the tube for directing particulate material deposited into the hopper such that the particulate material is guided onto the feed end portion of the belt and is moved thereon longitudinally of the tube into the feed end of the tube;

and an auger feed member mounted above the feed end of the belt and extending longitudinally therealong with a forward end of the auger feed member projecting into the feed end of the tube for assisting the feed of the particulate material into the feed end of the tube.

2. The conveyor according to claim 1 wherein the auger feed member comprises an elongate shaft with a flight engaged around the shaft.

3. The conveyor according to claim 2 wherein the flight is along the full length of the shaft.

4. The conveyor according to claim 4 wherein the flight gradually tapers from the remote end to the inside end.

5. The conveyor according to claim 4 wherein the flight gradually tapers from the remote end to the inside end.

6. The conveyor according to claim 2 wherein the shaft is substantially parallel to the belt.

7. The conveyor according to claim 2 wherein the shaft is arranged at a height such that the larger end of the flight is spaced above the belt and the portion of the flight extending into the tube is spaced from the tube.

8. The conveyor according to claim 2 wherein the shaft is mounted at a rear end on an end wall of the hopper and at a forward end on a hanger member located inside the tube.

* * * * *